US012198621B2

(12) United States Patent
Huang et al.

(10) Patent No.: US 12,198,621 B2
(45) Date of Patent: Jan. 14, 2025

(54) PIXEL CIRCUIT, DRIVING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yao Huang, Beijing (CN); Tianyi Cheng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/783,238

(22) PCT Filed: Jun. 23, 2021

(86) PCT No.: PCT/CN2021/101757
§ 371 (c)(1),
(2) Date: Jun. 7, 2022

(87) PCT Pub. No.: WO2022/266875
PCT Pub. Date: Dec. 29, 2022

(65) Prior Publication Data
US 2024/0169909 A1 May 23, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
None
See application file for complete search history.

(56) References Cited

U.S. PATENT DOCUMENTS

2016/0035805 A1* 2/2016 Kim ..................... H10K 50/813
345/76
2016/0111484 A1* 4/2016 An ....................... G09G 3/3266
438/155
(Continued)

FOREIGN PATENT DOCUMENTS

CN 107358915 A 11/2017
CN 107452331 A 12/2017
(Continued)

*Primary Examiner* — Dorothy Harris
(74) *Attorney, Agent, or Firm* — IPro, PLLC

(57) ABSTRACT

The present disclosure provides a pixel circuit, a driving method and a display device. The pixel circuit includes a first reset circuit and a driving circuit, the first reset circuit is respectively electrically connected to a first light emitting control line, a reset control line, a first reset voltage line and a first end of the driving circuit, and is configured to write a first reset voltage provided by the first reset voltage line into the first end of driving circuit under the control of a first light emitting control signal provided by the first light emitting control line and a reset control signal provided by the reset control line; the driving circuit is configured to connect the first end of the driving circuit and a second end of the driving circuit under the control of a potential of a control end of the driving circuit.

16 Claims, 10 Drawing Sheets

(52) U.S. Cl.
CPC . *G09G 2300/0861* (2013.01); *G09G 2310/08* (2013.01); *G09G 2320/0233* (2013.01); *G09G 2320/0247* (2013.01); *G09G 2330/021* (2013.01)

(56) References Cited

U.S. PATENT DOCUMENTS

| | | | | |
|---|---|---|---|---|
| 2016/0125809 | A1* | 5/2016 | Hwang | G09G 3/3258 345/212 |
| 2016/0189610 | A1* | 6/2016 | Xiao | G09G 3/3258 345/77 |
| 2016/0267843 | A1* | 9/2016 | Wang | G09G 3/3233 |
| 2017/0270867 | A1* | 9/2017 | Zhu | G09G 3/3233 |
| 2017/0278457 | A1* | 9/2017 | Zhu | G09G 3/3233 |
| 2018/0190194 | A1 | 7/2018 | Zhu et al. | |
| 2019/0172888 | A1* | 6/2019 | Choi | H10K 59/131 |
| 2019/0325826 | A1* | 10/2019 | Yang | G09G 3/3258 |
| 2020/0126478 | A1* | 4/2020 | Lee | G09G 3/325 |
| 2020/0327852 | A1* | 10/2020 | Ji | G09G 3/3233 |
| 2020/0335572 | A1* | 10/2020 | Mo | H10K 50/82 |
| 2020/0388214 | A1 | 12/2020 | Yang | |
| 2021/0005139 | A1* | 1/2021 | Ueno | G09G 3/3291 |
| 2021/0074213 | A1* | 3/2021 | Huang | G09G 3/3258 |
| 2021/0125562 | A1* | 4/2021 | Li | G09G 3/3258 |
| 2021/0366395 | A1 | 11/2021 | Yang et al. | |
| 2022/0157238 | A1* | 5/2022 | Wang | G09G 3/3233 |
| 2022/0238067 | A1* | 7/2022 | Park | G09G 3/32 |
| 2022/0310009 | A1* | 9/2022 | Wang | G09G 3/3233 |

FOREIGN PATENT DOCUMENTS

| | | | |
|---|---|---|---|
| CN | 108550346 | A | 9/2018 |
| CN | 108682386 | A | 10/2018 |
| CN | 110010058 | A | 7/2019 |
| CN | 110767163 | A | 2/2020 |
| JP | 2006017966 | A | 1/2006 |

* cited by examiner

PIXEL CIRCUIT, DRIVING METHOD AND DISPLAY DEVICE

CROSS-REFERENCE TO RELATED APPLICATION

This application is the U.S. national phase of PCT Application No. PCT/CN2021/101757 filed on Jun. 23, 2021, which is incorporated herein by reference in its entirety.

TECHNICAL FIELD

The present disclosure relates to the field of display technology, and more particularly to a pixel circuit, a driving method and a display device.

BACKGROUND

Existing low temperature polysilicon (LTPS) display panels utilize the high mobility characteristics of LTPS to apply in the display field that requires a high switching speed. However, LTPS thin film transistors (TFTs) have current leakage problems due to the characteristics of the transistors, and display effect in the low frequency display field is not good.

SUMMARY

A first aspect of the present disclosure provides a pixel circuit, including a first reset circuit and a driving circuit, wherein the first reset circuit is respectively electrically connected to a first light emitting control line, a reset control line, a first reset voltage line and a first end of the driving circuit, and is configured to write a first reset voltage provided by the first reset voltage line into the first end of driving circuit under the control of a first light emitting control signal provided by the first light emitting control line and a reset control signal provided by the reset control line; the driving circuit is configured to connect the first end of the driving circuit and a second end of the driving circuit under the control of a potential of a control end of the driving circuit.

Optionally, the first reset circuit comprises a first transistor and a second transistor; a control electrode of the first transistor is electrically connected to the first light emitting control line, and a first electrode of the first transistor is electrically connected to the first end of the driving circuit; a control electrode of the second transistor is electrically connected to the reset control line, a first electrode of the second transistor is electrically connected to a second electrode of the first transistor, and a second electrode of the second transistor is electrically connected to the first reset voltage line.

Optionally, the reset control line is a second light emitting control line, the first transistor is a p-type transistor, and the second transistor is an n-type transistor; the pixel circuit includes a first light emitting control circuit and a second light emitting control circuit; the first light emitting control circuit is respectively electrically connected to the first light emitting control line, the first end of the driving circuit and a first electrode of the light emitting element, and is configured to control to connect the first end of the driving circuit and the first electrode of the light emitting element under the control of the first light emitting control signal; the second light emitting control circuit is respectively electrically connected to the second light emitting control line, the first voltage end and the second end of the driving circuit, and is configured to control to connect the first voltage end and the second end of the driving circuit under the control of a second light emitting control signal provided by the second light emitting control line.

Optionally, the first reset circuit comprises a first transistor and a second transistor; a control electrode of the first transistor is electrically connected to the reset control line, and a first electrode of the first transistor is electrically connected to the first end of the driving circuit; a control electrode of the second transistor is electrically connected to the first light emitting control line, a first electrode of the second transistor is electrically connected to a second electrode of the first transistor, and a second electrode of the second transistor is electrically connected to the first reset voltage line.

Optionally, the reset control line is a second light emitting control line, the first transistor is an n-type transistor, and the second transistor is a p-type transistor; the pixel circuit includes a first light emitting control circuit and a second light emitting control circuit; the first light emitting control circuit is respectively electrically connected to the first light emitting control line, the first end of the driving circuit and a first electrode of the light emitting element, and is configured to control to connect the first end of the driving circuit and the first electrode of the light emitting element under the control of the first light emitting control signal; the second light emitting control circuit is respectively electrically connected to the second light emitting control line, the first voltage end and the second end of the driving circuit, and is configured to control to connect the first voltage end and the second end of the driving circuit under the control of a second light emitting control signal provided by the second light emitting control line.

Optionally, the reset control line is a first scan line, and both the first transistor and the second transistor are p-type transistors; the pixel circuit includes a first light emitting control circuit and a second light emitting control circuit; the first light emitting control circuit is respectively electrically connected to the second light emitting control line, the first end of the driving circuit and the first electrode of the light emitting element, and is configured to control to connect the first end of the driving circuit and the first electrode of the light emitting element under the control of the second light emitting control signal provided by the second light emitting control line; the second light emitting control circuit is respectively electrically connected to the first light emitting control line, the first voltage end and the second end of the driving circuit, and is configured to control to connect the first voltage end and the second end of the driving circuit under the control of the first light emitting control signal.

Optionally, the pixel circuit further includes a second reset circuit; the second reset circuit is respectively electrically connected to the second light emitting control line, a second reset voltage line and the first electrode of the light emitting element, and is configured to control to write a second reset voltage provided by the second reset voltage line into the first electrode of the light emitting element under the control of the second light emitting control signal.

Optionally, the second reset circuit comprises a third transistor; a control electrode of the third transistor is electrically connected to the second light emitting control line, a first electrode of the third transistor is electrically connected to the second reset voltage line, and a second electrode of the third transistor is electrically connected to the first electrodes of the light emitting element.

Optionally, the third transistor is an n-type transistor.

Optionally, the pixel circuit further includes a compensation control circuit, a data writing-in circuit and an energy storage circuit; the compensation control circuit is electrically connected to a second scan line, the control end of the driving circuit and the first end of the driving circuit, respectively, and is configured to control to connect the control end of the driving circuit and the first end of the driving circuit under the control of a second scan signal provided by the second scan line; the data writing-in circuit is electrically connected to a third scan line, a data line and the second end of the driving circuit respectively, and is configured to write a data voltage on the data line into the second end of the driving circuit under the control of a third scan signal provided by the third scan line; the energy storage circuit is electrically connected to the control end of the driving circuit and is configured to store electrical energy.

Optionally, the compensation control circuit includes a fourth transistor, the data writing-in circuit includes a fifth transistor, the driving circuit includes a driving transistor, and the energy storage circuit includes a storage capacitor; a control electrode of the driving transistor is electrically connected to the control end of the driving circuit, a first electrode of the driving transistor is electrically connected to the first end of the driving circuit, and a second electrode of the driving transistor is electrically connected to the second end of the driving circuit; a control electrode of the fourth transistor is electrically connected to the second scan line, a first electrode of the fourth transistor is electrically connected to the control electrode of the driving transistor, and a second electrode of the fourth transistor is electrically connected to the first electrode of the driving circuit; a control electrode of the fifth transistor is electrically connected to the third scan line, a first electrode of the fifth transistor is electrically connected to the data line, and a second electrode of the fifth transistor is electrically connected to the second electrode of the driving transistor; a first end of the storage capacitor is electrically connected to the control electrode of the driving transistor, and a second end of the storage capacitor is electrically connected to the first voltage end.

Optionally, the first light emitting control circuit includes a sixth transistor, and the second light emitting control circuit includes a seventh transistor; a control electrode of the sixth transistor is electrically connected to the first light emitting control line, a first electrode of the sixth transistor is electrically connected to the first end of the driving circuit, and a second electrode of the sixth transistor is electrically connected to the first electrode of the light emitting element; a control electrode of the seventh transistor is electrically connected to the second light emitting control line, a first electrode of the seventh transistor is electrically connected to the first voltage end, and a second electrode of the seventh transistor is electrically connected to the second end of the driving circuit; a second electrode of the light emitting element is electrically connected to the second voltage end.

Optionally, the first light emitting control circuit includes a sixth transistor, and the second light emitting control circuit includes a seventh transistor; a control electrode of the sixth transistor is electrically connected to the second light emitting control line, a first electrode of the sixth transistor is electrically connected to the first end of the driving circuit, and a second electrode of the sixth transistor is electrically connected to the first electrode of the light emitting element; a control electrode of the seventh transistor is electrically connected to the first light emitting control line, a first electrode of the seventh transistor is electrically connected to the first voltage end, and a second electrode of the seventh transistor is electrically connected to the second end of the driving circuit; a second electrode of the light emitting element is electrically connected to the second voltage end.

In a second aspect, an embodiment of the present disclosure provides a driving method, applied to the pixel circuit applied to a display panel, the driving method includes: in a refresh reset phase and a maintenance reset phase, controlling, by the first reset circuit, to write the first reset voltage provided by the first reset voltage line into the first end of the driving circuit under the control of the first light emitting control signal provided by the light emitting control line and the reset control signal provided by the reset control line.

Optionally, the pixel circuit further comprises a compensation control circuit; the driving method further includes: in the refresh reset phase, controlling, by the compensation control circuit, to connect the first end of the driving circuit and the control end of the driving circuit under the control of a second scan signal provided by a second scan line, to write the first reset voltage into the control end of the driving circuit.

Optionally, the pixel circuit further comprises a light emitting element, a compensation control circuit, a data writing-in circuit, an energy storage circuit, a first light emitting control circuit, and a second light emitting control circuit; a refresh display period further includes a refresh charging phase and a refresh light emitting phase after the refresh reset phase; the driving method further includes: in the refresh charging phase, controlling, by the data writing-in circuit, to write a data voltage on a data line into the second end of the driving circuit under the control of a third scan signal provided by a third scan line, and controlling, by the compensation control circuit, to connect the first end of the driving circuit and the control end of the driving circuit under the control of the second scan signal; in the refresh light emitting phase, controlling, by the first light emitting control circuit, to connect the first end of the driving circuit and the first electrode of the light emitting element, controlling, by the second light emitting control circuit, to connect the first voltage end and the second end of the driving circuit; and driving, by the driving circuit, the light emitting element to emit light.

Optionally, the pixel circuit further comprises a first light emitting control circuit and a light emitting element; the reset control line is a second light emitting control line; the first light emitting control circuit is electrically connected to the first light emitting control line; the driving method further includes: in the refresh reset phase and the maintenance reset phase, controlling, by the first light emitting control circuit, to connect the first end of the driving circuit and the first electrode of the light emitting element under the control of the first light emitting control signal, to control to write the first reset voltage into the first electrode of the light emitting element.

Optionally, the pixel circuit further comprises a first light emitting control circuit, a second reset circuit and a light emitting element; the first light emitting control circuit is electrically connected to the second light emitting control line; the driving method further includes: in the refresh reset phase and the maintenance reset phase, controlling, by the first light emitting control circuit, to disconnect the first end of the driving circuit from the first electrode of the light emitting element under the control of the second light emitting control signal, and controlling, by the second reset circuit, to write the second reset voltage into the first electrode of the light emitting element under the control of the second light emitting control signal.

Optionally, a maintenance display period further includes a maintenance light emitting phase after the maintenance reset phase; the driving method further includes: in the maintenance light emitting phase, controlling, by the first light emitting control circuit, to connect the first end of the driving circuit and the first electrode of the light emitting element; controlling, by the second light emitting control circuit, to connect the first voltage end and the second end of the driving circuit; driving, by the driving circuit, the light emitting element to emit light.

Optionally, the driving method further includes: detecting a display brightness range of the display panel, and when maximum brightness corresponding to the display brightness range is less than or equal to a predetermined brightness, controlling to increase a frequency of the first light emitting control signal and a frequency of the second light emitting control signal provided by the second light emitting control line, so that the frequency of the first light emitting control signal and the frequency of the second light emitting control signal are greater than a predetermined frequency.

Optionally, the driving method further includes: detecting a display brightness range of the display panel, and when maximum brightness corresponding to the display brightness range is less than or equal to a predetermined brightness, controlling to increase a frequency of the second light emitting control signal provided by the second light emitting control line, so that the frequency of the second light emitting control signal is greater than a predetermined frequency.

In a third aspect, an embodiment of the present disclosure provides a display device including the pixel circuit.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor other than the control electrode, one electrode is called the first electrode, and the other electrode is called the second electrode.

In actual operation, when the transistor is a triode, the control electrode may be the base, the first electrode may be the collector, and the second electrode may be the emitter; or the control electrode may be the base, the first electrode can be the emitter, and the second electrode can be the collector.

In actual operation, when the transistor is a thin film transistor or a field effect transistor, the control electrode may be a gate electrode, the first electrode may be a drain electrode, and the second electrode may be a source electrode. The control electrode may be a gate electrode, the first electrode may be a source electrode, and the second electrode may be a drain electrode.

Figure 1:
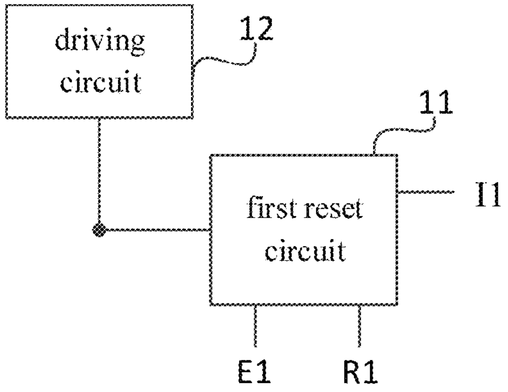
FIG. 1 is a structural diagram of a pixel circuit according to an embodiment of the present disclosure.

As shown in FIG. 1, the pixel circuit according to the embodiment of the present disclosure includes a first reset circuit 11 and a driving circuit 12;

The first reset circuit 11 is respectively electrically connected to a first light emitting control line E1, a reset control line R1, a first reset voltage line I1 and a first end of the driving circuit 12, and is configured to write the first reset voltage Vi1 provided by the first reset voltage line I1 into the first end of driving circuit 12 under the control of a first light emitting control signal provided by the first light emitting control line E1 and a reset control signal provided by the reset control line R1;

The driving circuit 12 is configured to connect the first end of the driving circuit 12 and the second end of the driving circuit 12 under the control of a potential of the control end of the driving circuit 12.

The pixel circuit described in the embodiment of the present disclosure writes the first reset voltage Vi1 into the first end of the driving circuit 12 through the first reset circuit 11 under the control of the first light emitting control signal and the reset control signal, and writes the first reset voltage Vi1 into the control end of the driving circuit 12 in a refresh reset phase and a maintenance reset phase with the cooperation of the compensation control circuit, so as to provide a new structure of the pixel circuit and realize the reset of an essential node.

When the pixel circuit shown in FIG. 1 of the present disclosure is in operation, the refresh display period may include a refresh reset phase, and the maintenance display period may include a maintenance reset phase. In the refresh reset phase and the maintenance reset phase, the first reset circuit 11 writes Vi1 to the first end of the driving circuit 12 under the control of the first light emitting control signal and the reset control signal.

In at least one embodiment of the present disclosure, the first reset circuit may include a first transistor and a second transistor;

A control electrode of the first transistor is electrically connected to the first light emitting control line, and a first electrode of the first transistor is electrically connected to the first end of the driving circuit;

A control electrode of the second transistor is electrically connected to the reset control line, a first electrode of the second transistor is electrically connected to a second electrode of the first transistor, and a second electrode of the second transistor is electrically connected to the first reset voltage line.

Optionally, the reset control line is a second light emitting control line, the first transistor is a p-type transistor, and the second transistor is an n-type transistor;

The pixel circuit includes a first light emitting control circuit and a second light emitting control circuit;

The first light emitting control circuit is respectively electrically connected to the first light emitting control line, the first end of the driving circuit and the first electrode of the light emitting element, and is configured to control to connect the first end of the driving circuit and the first electrode of the light emitting element under the control of the first light emitting control signal;

The second light emitting control circuit is respectively electrically connected to the second light emitting control line, the first voltage end and the second end of the driving circuit, and is configured to control to connect the first voltage end and the second end of the driving circuit under the control of the second light emitting control signal provided by the second light emitting control line.

Figure 2:
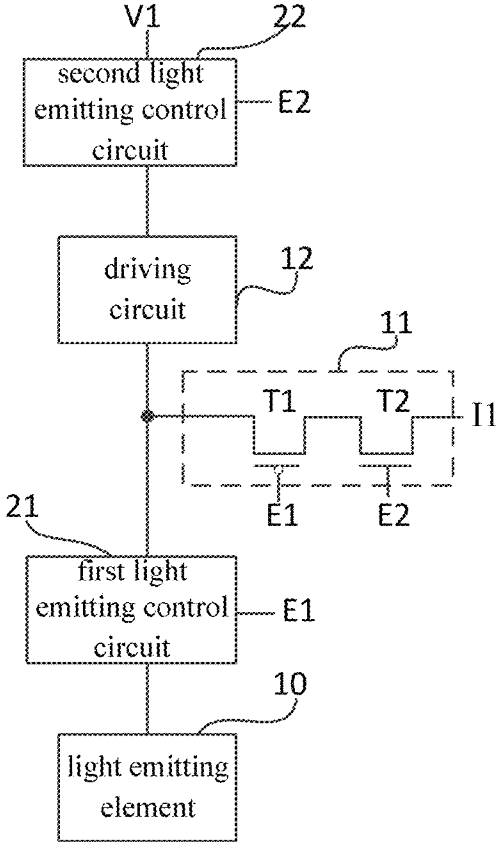
FIG. 2 is a structural diagram of a pixel circuit according to at least one embodiment of the present disclosure.

As shown in FIG. 2, based on the embodiment of the pixel circuit shown in FIG. 1, the reset control line is a second light emitting control line E2; the pixel circuit according to at least one embodiment of the present disclosure further includes a first light emitting control circuit 21 and a second light emitting control circuit 22;

The first reset circuit 11 includes a first transistor T1 and a second transistor T2;

The gate electrode of the first transistor T1 is electrically connected to the first light emitting control line E1, and the source electrode of the first transistor T1 is electrically connected to the first end of the driving circuit 12;

The gate electrode of the second transistor T2 is electrically connected to the second light emitting control line E2, the source electrode of the second transistor T2 is electrically connected to the drain electrode of the first transistor T1, and the drain electrode of the second transistor T2 is electrically connected to the first reset voltage line I1;

The first light emitting control circuit 21 is respectively electrically connected to the first light emitting control line E1, the first end of the driving circuit 12 and the first electrode of the light emitting element 10, and is configured to connect the first end of the driving circuit 12 and the first electrode of the light emitting element 10 under the control of the first light emitting control signal;

The second light emitting control circuit 21 is respectively electrically connected to the second light emitting control line E2, the first voltage end V1 and the second end of the driving circuit 12, and is configured to control to connect the first voltage end V1 and the second end of the driving circuit 12 under the control of the second light emitting control signal provided by the second light emitting control line E2.

T1 is a p-type transistor and T2 is an n-type transistor.

During the operation of at least one embodiment of the pixel circuit shown in FIG. 2 of the present disclosure, in the refresh reset phase and the maintenance reset phase, the potential of the first light emitting control signal is a low voltage, and the potential of the second light emitting control signal is high voltage, E1 provides a low voltage signal, E2 provides a high voltage signal, T1 and T2 are turned on, the first light emitting control circuit 21 controls to connect the first end of the driving circuit 12 and the first electrode of the light emitting element 10 under the control of the first light emitting control signal, so as to provide the first reset voltage Vi1 provided by the first reset voltage line I1 to the first electrode of the light emitting element 10, and clear the residual charge of the first electrode of the light emitting element 10.

In at least one embodiment of the pixel circuit shown in FIG. 2 of the present disclosure, T1 may be a low temperature polysilicon thin film transistor, and T2 may be an IGZO (indium gallium zinc oxide) thin film transistor.

In at least one embodiment of the present disclosure, the first reset circuit may include a first transistor and a second transistor;

A control electrode of the first transistor is electrically connected to the reset control line, and a first electrode of the first transistor is electrically connected to the first end of the driving circuit;

A control electrode of the second transistor is electrically connected to the first light emitting control line, a first electrode of the second transistor is electrically connected to a second electrode of the first transistor, and a second electrode of the second transistor is electrically connected to the first reset voltage line.

Optionally, the reset control line is a second light emitting control line, the first transistor is an n-type transistor, and the second transistor is a p-type transistor;

The pixel circuit includes a first light emitting control circuit and a second light emitting control circuit;

The first light emitting control circuit is respectively electrically connected to the first light emitting control line, the first end of the driving circuit and the first electrode of the light emitting element, and is configured to control to connect the first end of the driving circuit and the first electrode of the light emitting element under the control of the first light emitting control signal;

The second light emitting control circuit is respectively electrically connected to the second light emitting control line, the first voltage end and the second end of the driving circuit, and is configured to control to connect the first voltage end and the second end of the driving circuit under the control of the second light emitting control signal provided by the second light emitting control line.

Figure 3:
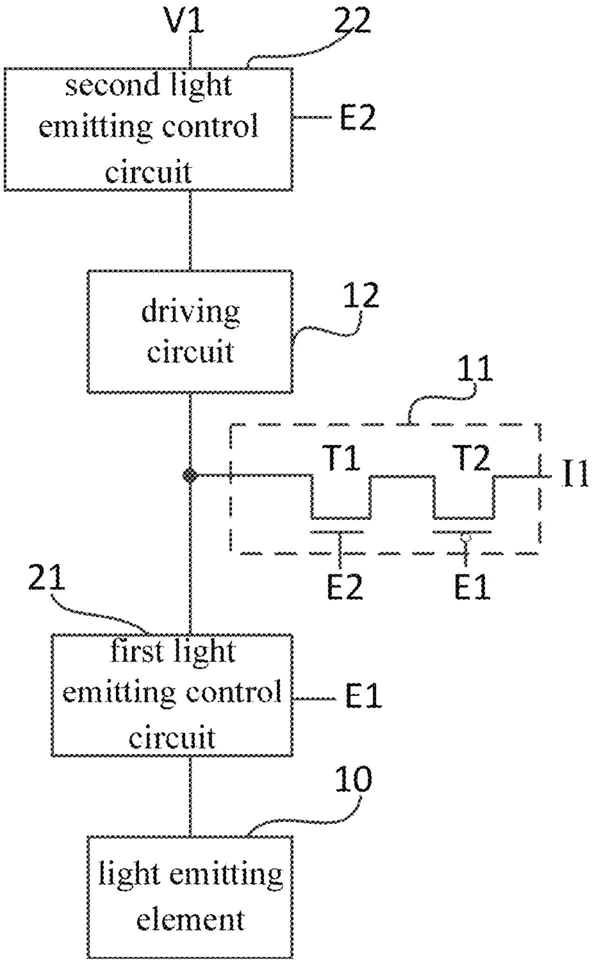
FIG. 3 is a structural diagram of a pixel circuit according to at least one embodiment of the present disclosure.
Figure 14:
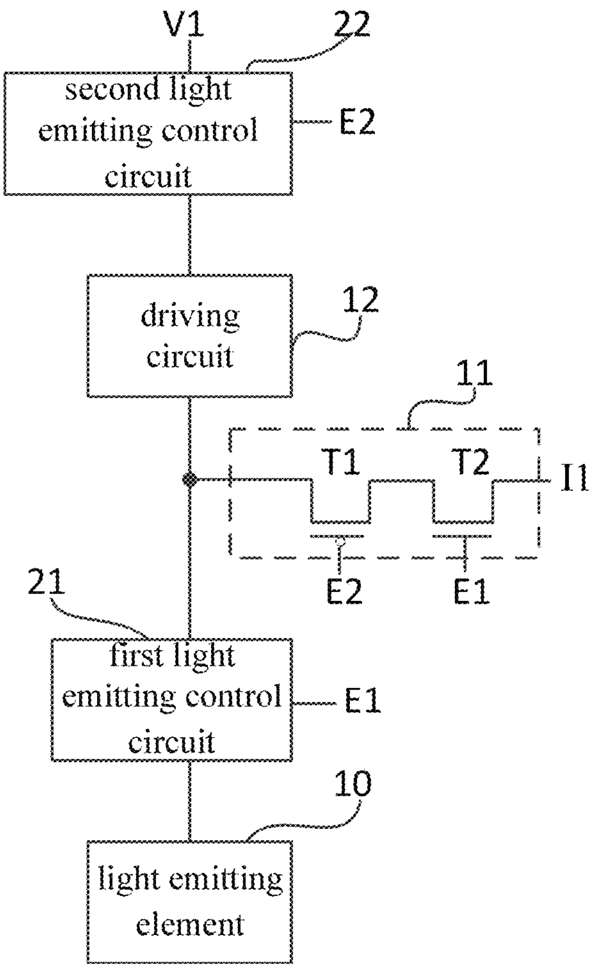
FIG. 14 is a structural diagram of a pixel circuit according to at least one embodiment of the present disclosure.

As shown in FIG. 3, based on the embodiment of the pixel circuit shown in FIG. 1, the reset control line R1 is a second light emitting control line E2; the pixel circuit according to at least one embodiment of the present disclosure further includes a first light emitting control circuit 21 and a second light emitting control circuit 22;

The first reset circuit 11 includes a first transistor T1 and a second transistor T2;

The gate electrode of the first transistor T1 is electrically connected to the second light emitting control line E2, and the source electrode of the first transistor T1 is electrically connected to the first end of the driving circuit 12;

The gate electrode of the second transistor T2 is electrically connected to the first light emitting control line E1, the source electrode of the second transistor T2 is electrically connected to the drain electrode of the first transistor T1, and the drain electrode of the second transistor T2 is electrically connected to the first reset voltage line I1;

The first light emitting control circuit 21 is respectively electrically connected to the first light emitting control line E1, the first end of the driving circuit 12 and the first electrode of the light emitting element 10, and is configured to connect the first end of the driving circuit 12 and the first electrode of the light emitting element 10 under the control the first light emitting control signal;

The second light emitting control circuit 21 is respectively electrically connected to the second light emitting control line E2, the first voltage end V1 and the second end of the driving circuit 12, and is configured to control to connect the first voltage end V1 and the second end of the driving circuit 12 under the control of the second light emitting control signal provided by the second light emitting control line E2;

T1 is an n-type transistor and T2 is a p-type transistor, as shown in FIG. 3. Alternatively, T1 is a p-type transistor and T2 is an n-type transistor, as shown in FIG. 14.

During the operation of at least one embodiment of the pixel circuit shown in FIG. 3 of the present disclosure, in the refresh reset phase and the maintenance reset phase, the potential of the first light emitting control signal is a low voltage, and the potential of the second light emitting control signal is a high voltage, E1 provides a low voltage signal, E2 provides a high voltage signal, T1 and T2 are turned on, the first light emitting control circuit 21 controls to connect the first end of the driving control circuit 12 and the first electrode of the light emitting element 10 under the control of the first light emitting control signal, so as to provide the first reset voltage Vi1 provided by the first reset voltage line I1 to the first electrode of the light emitting element 10, and clear the residual charge of the first electrode of the light emitting element 10.

In at least one embodiment of the pixel circuit shown in FIG. 3 of the present disclosure, T2 may be a low temperature polysilicon thin film transistor, and T1 may be an IGZO (indium gallium zinc oxide) thin film transistor.

Optionally, the first light emitting control circuit includes a sixth transistor, and the second light emitting control circuit includes a seventh transistor;

A control electrode of the sixth transistor is electrically connected to the first light emitting control line, a first electrode of the sixth transistor is electrically connected to the first end of the driving circuit, and a second electrode of the sixth transistor is electrically connected to the first electrode of the light emitting element;

A control electrode of the seventh transistor is electrically connected to the second light emitting control line, a first electrode of the seventh transistor is electrically connected to the first voltage end, and a second electrode of the seventh transistor is electrically connected to the second end of the driving circuit;

The second electrode of the light emitting element is electrically connected to the second voltage end.

Optionally, the reset control line is a first scan line, and both the first transistor and the second transistor are p-type transistors;

The pixel circuit includes a first light emitting control circuit and a second light emitting control circuit;

The first light emitting control circuit is respectively electrically connected to the second light emitting control line, the first end of the driving circuit and the first electrode of the light emitting element, and is configured to control to connect the first end of the driving circuit and the first electrode of the light emitting element under the control of the second light emitting control signal provided by the second light emitting control line;

The second light emitting control circuit is respectively electrically connected to the first light emitting control line, the first voltage end and the second end of the driving circuit, and is configured to control to connect the first voltage end and the second end of the driving circuit under the control of the first light emitting control signal.

Figure 4:
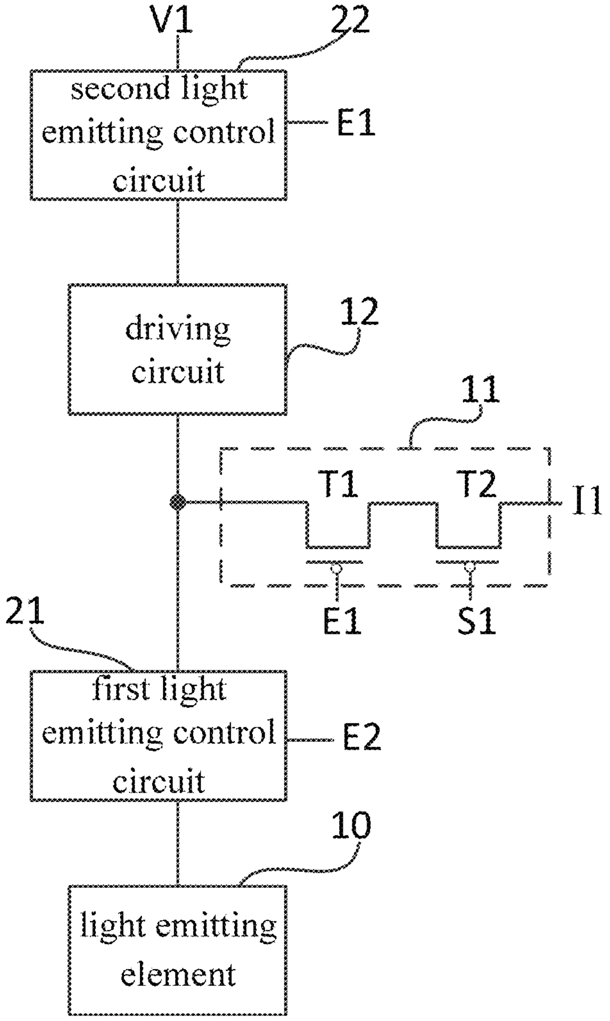
FIG. 4 is a structural diagram of a pixel circuit according to at least one embodiment of the present disclosure.

As shown in FIG. 4, based on the embodiment of the pixel circuit shown in FIG. 1, the reset control line R1 is the first scan line S1; the pixel circuit according to at least one embodiment of the present disclosure further includes a first light emitting control circuit 21 and a second light emitting control circuit 22;

The first reset circuit 11 includes a first transistor T1 and a second transistor T2;

The gate electrode of the first transistor T1 is electrically connected to the first light emitting control line E1, and the source electrode of the first transistor T1 is electrically connected to the first end of the driving circuit 12;

The gate electrode of the second transistor T2 is electrically connected to the first scan line S1, the source electrode of the second transistor T2 is electrically connected to the drain electrode of the first transistor T1, and the drain electrode of the second transistor T2 is electrically connected to the first reset voltage line I1;

The first light emitting control circuit 21 is respectively electrically connected to the second light emitting control line E2, the first end of the driving circuit 12 and the first electrode of the light emitting element 10, and is configured to control to connect the first end of the driving circuit 12 and the first electrode of the light emitting element 10 under the control of the second light emitting control signal provided by the second light emitting control line E2;

The second light emitting control circuit 22 is respectively electrically connected to the first light emitting control line E1, the first voltage end V1 and the second end of the driving circuit 12, and is configured to control to connect the first voltage end V1 and the second end of the driving circuit 12 under the control of the second light emitting control signal provided by the first light emitting control line E1;

T1 is a p-type transistor and T2 is a p-type transistor.

In at least one embodiment of the pixel circuit shown in FIG. 4 of the present disclosure, T1 and T2 may be low temperature polysilicon thin film transistors.

When at least one embodiment of the pixel circuit shown in FIG. 4 of the present disclosure is in operation, in the refresh reset phase and the maintenance reset phase, the potential of the first light emitting control signal provided by E1 is a low voltage, and the potential of the first scan signal provided by S1 is a low voltage, and T1 and T2 are turned on to write the first reset voltage Vi1 provided by the first reset voltage line into the first end of the driving circuit 12.

Figure 5:
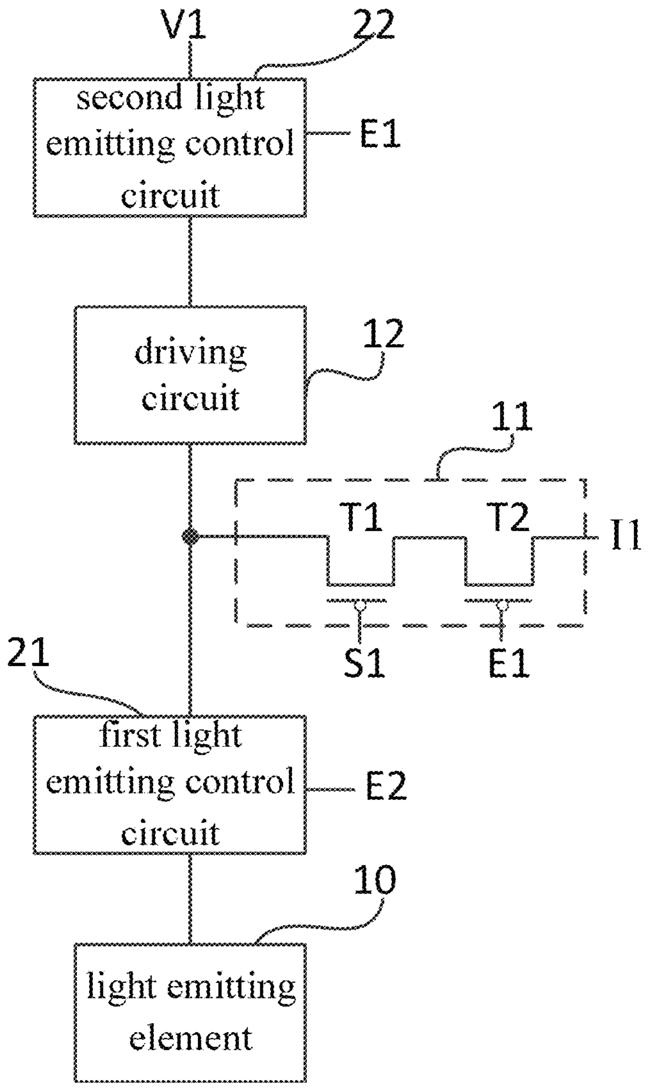
FIG. 5 is a structural diagram of a pixel circuit according to at least one embodiment of the present disclosure.

As shown in FIG. 5, on the basis of the embodiment of the pixel circuit shown in FIG. 1, the reset control line is the first scan line S1; the pixel circuit according to at least one embodiment of the present disclosure further includes a first light emitting a control circuit 21 and a second light emitting control circuit 22;

The first reset circuit 11 includes a first transistor T1 and a second transistor T2;

The gate electrode of the first transistor T1 is electrically connected to the first scan line S1, and the source electrode of the first transistor T1 is electrically connected to the first end of the driving circuit 12;

The gate electrode of the second transistor T2 is electrically connected to the first light emitting control line E1, the source electrode of the second transistor T2 is electrically connected to the drain electrode of the first transistor T1, and the drain electrode of the second transistor T2 is electrically connected electrically connected to the first reset voltage line I1;

The first light emitting control circuit 21 is respectively electrically connected to the second light emitting control line E2, the first end of the driving circuit 12 and the first electrode of the light emitting element 10, and is configured to control to connect the first end of the driving circuit 12 and the first electrode of the light emitting element 10 under the control of the second light emitting control signal provided by the second light emitting control line E;

The second light emitting control circuit 22 is respectively electrically connected to the first light emitting control line E1, the first voltage end V1 and the second end of the driving circuit 12, and is configured to control to connect the first voltage end V1 and the second end of the driving circuit 12 under the control of the second light emitting control signal provided by the first light emitting control line E1; T1 is a p-type transistor and T2 is a p-type transistor.

In at least one embodiment of the pixel circuit shown in FIG. 5 of the present disclosure, T1 and T2 may be low temperature polysilicon thin film transistors.

When at least one embodiment of the pixel circuit shown in FIG. 5 of the present disclosure is in operation, in the refresh reset phase and the maintenance reset phase, the potential of the first light emitting control signal provided by E1 is a low voltage, and the potential of the first scan provided by S1 is a low voltage, and T1 and T2 are turned on to write the first reset voltage Vi1 provided by the first reset voltage line into the first end of the driving circuit 12.

Optionally, the first light emitting control circuit includes a sixth transistor, and the second light emitting control circuit includes a seventh transistor;

A control electrode of the sixth transistor is electrically connected to the second light emitting control line, a first electrode of the sixth transistor is electrically connected to the first end of the driving circuit, and a second electrode of the sixth transistor is electrically connected to the first electrode of the light emitting element;

A control electrode of the seventh transistor is electrically connected to the first light emitting control line, a first electrode of the seventh transistor is electrically connected to the first voltage end, and a second electrode of the seventh transistor is electrically connected to the second end of the driving circuit;

The second electrode of the light emitting element is electrically connected to the second voltage end.

Figure 6:
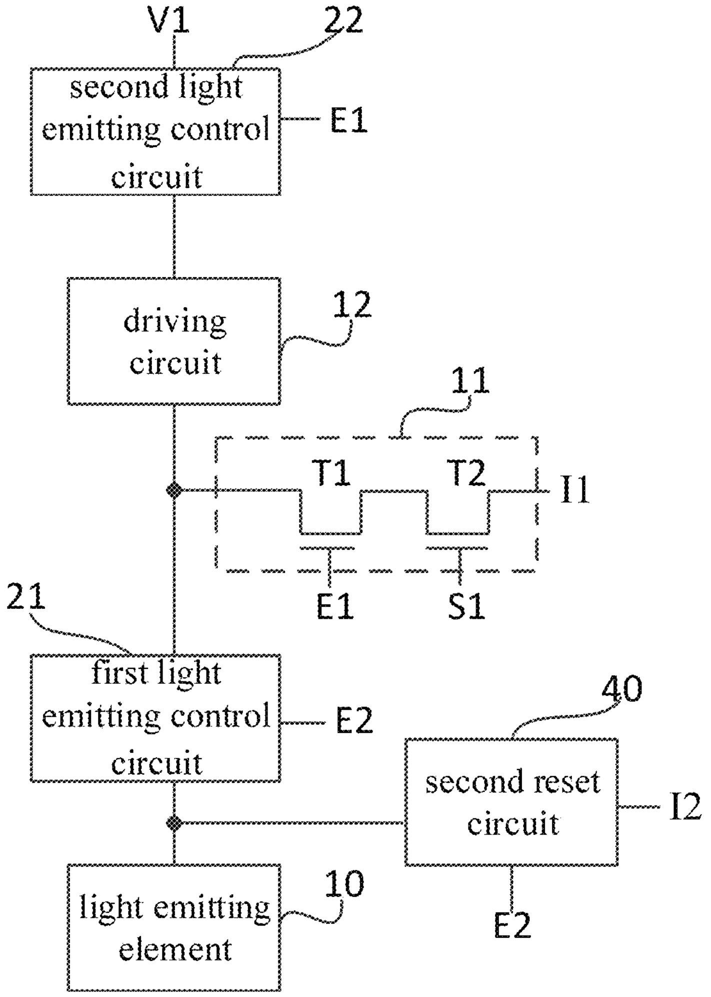
FIG. 6 is a structural diagram of a pixel circuit according to at least one embodiment of the present disclosure.

As shown in FIG. 6, on the basis of at least one embodiment of the pixel circuit shown in FIG. 4, the pixel circuit according to at least one embodiment of the present disclosure may further include a second reset circuit 40;

The second reset circuit 40 is respectively electrically connected to the second light emitting control line E2, the second reset voltage line 12 and the first electrode of the light emitting element 10, and is configured to control to write the second reset voltage Vi2 provided by the second reset voltage line 12 into the first electrode of the light emitting element 10 under the control of the second light emitting control signal provided by the second light emitting control line E2.

During the operation of at least one embodiment of the pixel circuit shown in FIG. 6 of the present disclosure, in the refresh reset phase, the refresh charge phase and the maintenance reset phase, the second reset circuit 40 is configured to write Vi2 into the first electrode of the light emitting element 10 under the control of the second light emitting control signal, so as to remove the residual charge of the first electrode of the light emitting element 10.

Optionally, the second reset circuit includes a third transistor;

A control electrode of the third transistor is electrically connected to the second light emitting control line, a first electrode of the third transistor is electrically connected to the second reset voltage line, and a second electrode of the third transistor is electrically connected to the first electrodes of the light emitting element.

In at least one embodiment of the present disclosure, the third transistor is an n-type transistor, and the third transistor may be an IGZO thin film transistor.

The pixel circuit described in at least one embodiment of the present disclosure may further include a compensation control circuit, a data writing-in circuit, and an energy storage circuit;

The compensation control circuit is electrically connected to the second scan line, the control end of the driving circuit and the first end of the driving circuit, respectively, and is configured to control to connect the control end of the driving circuit and the first end of the driving circuit under the control of the second scan signal provided by the second scan line;

The data writing-in circuit is electrically connected to the third scan line, the data line and the second end of the driving circuit respectively, and is configured to write a data voltage on the data line into the second end of the driving circuit under the control of the third scan signal provided by the third scan line;

The energy storage circuit is electrically connected to the control end of the driving circuit and is configured to store electrical energy.

Figure 7:
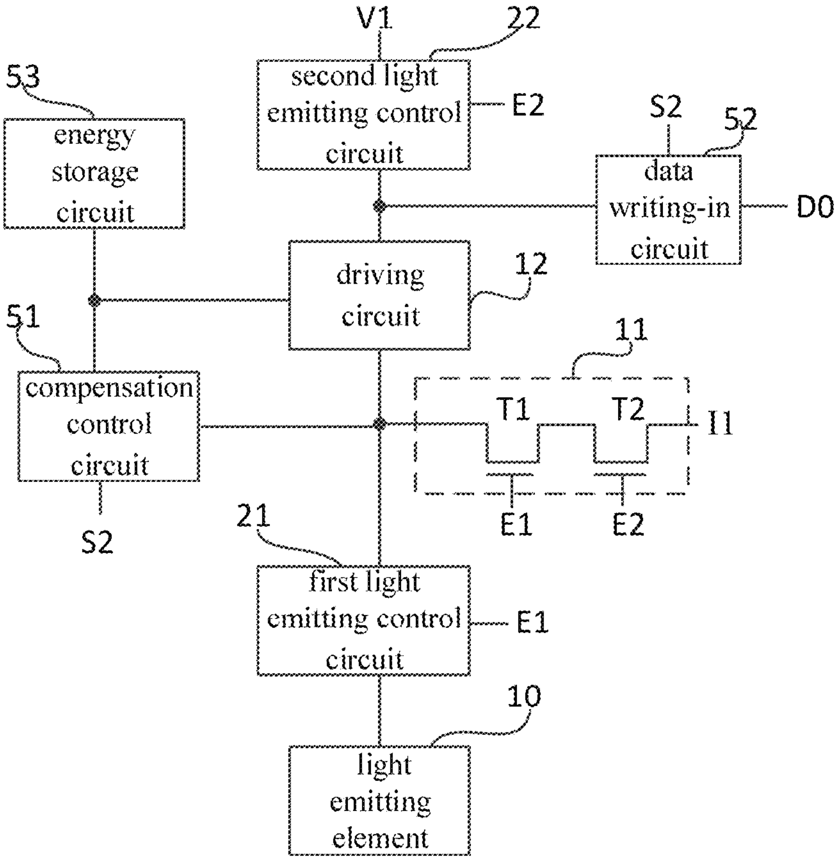
FIG. 7 is a structural diagram of a pixel circuit according to at least one embodiment of the present disclosure.

As shown in FIG. 7, on the basis of at least one embodiment of the pixel circuit shown in FIG. 2, the pixel circuit according to at least one embodiment of the present disclosure may further include a compensation control circuit 51, a data writing-in circuit 52 and an energy storage circuit 53;

The compensation control circuit 51 is respectively electrically connected to the second scan line S2, the control end of the driving circuit 12 and the first end of the driving circuit 12, and is configured to control to connect the control end of the driving circuit 12 and the first end of the driving circuit 12 under the control of the second scan signal provided by the second scan line S2;

The data writing-in circuit 52 is respectively electrically connected to the third scan line S3, the data line D0 and the second end of the driving circuit 12, and is configured to write the data voltage on the data line D0 into the second end of the driving circuit 12 under the control of the third scan signal provided by the third scan line S3;

The energy storage circuit 53 is electrically connected to the control end of the driving circuit for storing electrical energy.

During the operation of at least one embodiment of the pixel circuit shown in FIG. 7 of the present disclosure, in the refresh reset phase, the compensation control circuit 51 controls to connect the control end of the driving circuit 12 and the first end of the driving circuit 12 under the control of the second scan signal, so as to write the first reset voltage Vi into the control end of the driving circuit 12, so that when the refresh charging phase starts, the driving circuit 12 can connect the first end and the second end thereof under the control of the control end thereof;

In the refresh charging phase, under the control of the third scan signal, the data writing-in circuit 52 writes the data voltage to the second end of the driving circuit 12 to charge the energy storage circuit 53 through the data voltage, thereby increasing the potential of the control end of the driving circuit 12 until the driving circuit 12 disconnects the first end from the second end under the control of the potential of the control end.

Figure 8:
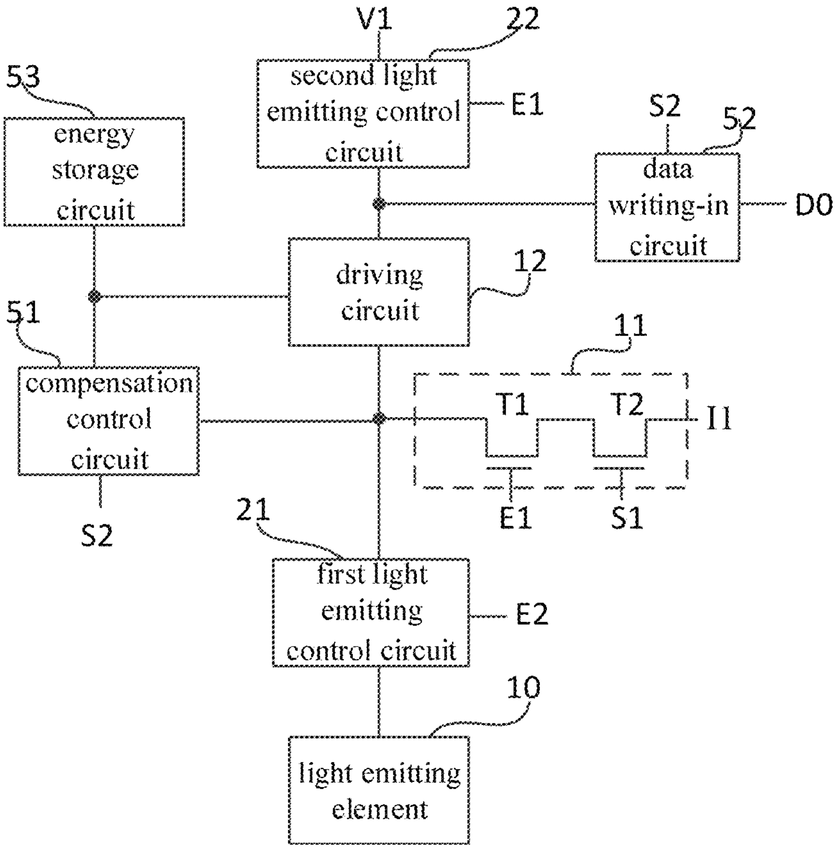
FIG. 8 is a structural diagram of a pixel circuit according to at least one embodiment of the present disclosure.

As shown in FIG. 8, on the basis of at least one embodiment of the pixel circuit shown in FIG. 6, the pixel circuit according to at least one embodiment of the present disclosure may further include a compensation control circuit 51, a data writing-in circuit 52 and an energy storage circuit 53;

The compensation control circuit 51 is respectively electrically connected to the second scan line S2, the control end of the driving circuit 12 and the first end of the driving circuit 12, and is configured to control to connect the control end of the driving circuit 12 and the first end of the driving circuit 12 under the control of the second scan signal provided by the second scan line S2;

The data writing-in circuit 52 is respectively electrically connected to the third scan line S3, the data line D0 and the second end of the driving circuit 12, and is configured to write the data voltage on the data line D0 into the second end of the driving circuit 12 under the control of the third scan signal provided by the third scan line S3;

The energy storage circuit 53 is electrically connected to the control end of the driving circuit for storing electrical energy.

During the operation of at least one embodiment of the pixel circuit shown in FIG. 8 of the present disclosure, in the refresh reset phase, the compensation control circuit 51 controls to connect the control end of the driving circuit 12 and the first end of the driving circuit 12 under the control of the second scan signal, so as to write the first reset voltage Vi into the control end of the driving circuit 12, so that when the refresh charging phase starts, the driving circuit 12 can connect the first end and the second end thereof under the control of the potential of the control end thereof.

In the refresh charging phase, under the control of the third scan signal, the data writing-in circuit 52 writes the data voltage to the second end of the driving circuit 12 to charge the energy storage circuit 53 through the data voltage, thereby increasing the potential of the control end of the driving circuit 12 until the driving circuit 12 disconnects the first end from the second end under the control of the potential of the control end.

Optionally, the compensation control circuit includes a fourth transistor, the data writing-in circuit includes a fifth transistor, the driving circuit includes a driving transistor, and the energy storage circuit includes a storage capacitor;

A control electrode of the driving transistor is electrically connected to the control end of the driving circuit, a first electrode of the driving transistor is electrically connected to the first end of the driving circuit, and a second electrode of the driving transistor is electrically connected to the second end of the driving circuit;

A control electrode of the fourth transistor is electrically connected to the second scan line, a first electrode of the fourth transistor is electrically connected to the control electrode of the driving transistor, and a second electrode of the fourth transistor is electrically connected to the first electrode of the driving circuit;

A control electrode of the fifth transistor is electrically connected to the third scan line, a first electrode of the fifth transistor is electrically connected to the data line, and a second electrode of the fifth transistor is electrically connected to the second electrode of the driving transistor;

A first end of the storage capacitor is electrically connected to the control electrode of the driving transistor, and a second end of the storage capacitor is electrically connected to the first voltage end.

Optionally, the fourth transistor may be an n-type transistor, the fifth transistor and the driving transistor are p-type transistors; the fourth transistor is an IGZO thin film transistor, and the fifth transistor and the driving transistor are low temperature polysilicon thin film transistors.

Figure 9:
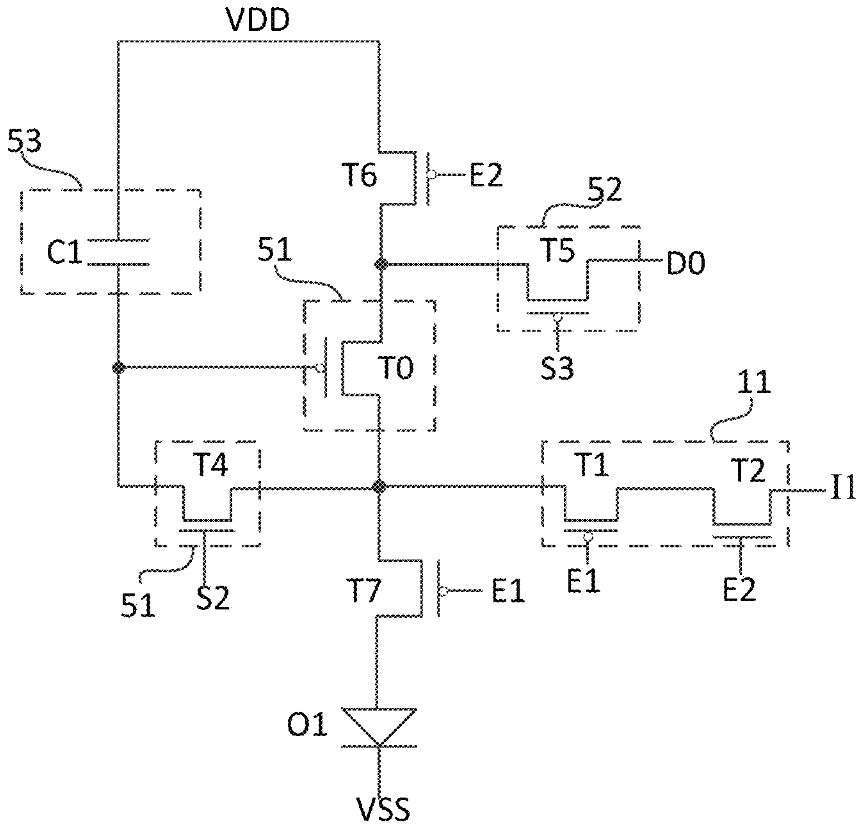
FIG. 9 is a circuit diagram of a pixel circuit according to at least one embodiment of the present disclosure.

As shown in FIG. 9, based on at least one embodiment of the pixel circuit shown in FIG. 7, the light emitting element is an organic light emitting diode O1; the compensation control circuit 51 includes a fourth transistor T4, and the data writing-in circuit 52 includes a fifth transistor T5, the driving circuit 12 includes a driving transistor T0, and the energy storage circuit 53 includes a storage capacitor C1;

The gate electrode of the driving transistor T0 is electrically connected to the control end of the driving circuit 12, the drain electrode of the driving transistor T0 is electrically connected to the first end of the driving circuit 12, and the source electrode of the driving transistor T0 is electrically connected to the second end of the driving circuit 12;

The gate electrode of the fourth transistor T4 is electrically connected to the second scan line S2, the source electrode of the fourth transistor T4 is electrically connected to the gate electrode of the driving transistor T0, and the drain electrode of the fourth transistor T4 is electrically connected to the drain electrode of the driving transistor;

The gate electrode of the fifth transistor T5 is electrically connected to the third scan line S3, the source electrode of the fifth transistor T5 is electrically connected to the data line D0, and the drain electrode of the fifth transistor T5 is electrically connected to the source electrode of the driving transistor T0;

The first end of the storage capacitor C1 is electrically connected to the gate electrode of the driving transistor T0, and the second end of the storage capacitor C1 is electrically connected to the high voltage end; the high voltage end is used to provide the high voltage signal VDD;

The first light emitting control circuit includes a sixth transistor T6, and the second light emitting control circuit 22 includes a seventh transistor T7;

The gate electrode of the sixth transistor T6 is electrically connected to the first light emitting control line E1, the source electrode of the sixth transistor T6 is electrically connected to the drain electrode of the driving transistor T0, and the drain electrode of the sixth transistor T6 is electrically connected to the anode of O1;

The gate electrode of the seventh transistor T7 is electrically connected to the second light emitting control line E2, the source electrode of the seventh transistor T7 is electrically connected to the high voltage end, and the drain electrode of the seventh transistor T7 is electrically connected to the source electrode of the driving transistor T0;

The cathode of O1 is electrically connected to the low voltage end; the low voltage end is used for providing the low voltage signal VSS.

In at least one embodiment of the pixel circuit shown in FIG. 9, the first voltage end is a high voltage end, and the second voltage end is a low voltage end; T1, T0, T5, T6 and T7 are p-type transistors, and T2 and T4 are n-type transistors; T1, T0, T5, T6 and T7 are low temperature polysilicon thin film transistors, and T2 and T4 are IGZO (indium gallium zinc oxide) thin film transistors.

Figure 10:
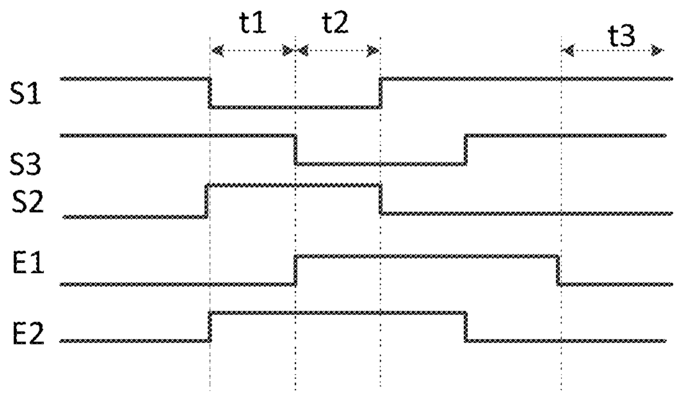
FIG. 10 is a working timing diagram of a pixel circuit according to at least one embodiment of the present disclosure.

As shown in FIG. 10, when at least one embodiment of the pixel circuit shown in FIG. 9 of the present disclosure is in operation, a refresh display period includes a refresh reset phase t1, a refresh charging phase t2 and a refresh light emitting phase t3;

In the refresh reset phase t1, the potential of the first light emitting control signal provided by E1 is a low voltage, the potential of the second light emitting control signal provided by E2 is a high voltage, the potential of the second scan signal provided by S2 is a high voltage, and the potential of the third scan signal provided by S3 is a high voltage, T1 is turned on, T2 is turned on, and T4 is turned on, so as to write the first reset voltage Vi1 provided by I1 into the gate electrode of T0, so that when the refresh charging phase t2 starts, TO can be turned on; T6 is turned on to write Vi1 into the anode of O1, to clear the residual charge of the anode of O1; T7 is turned off, T5 is turned off;

In the refresh charging phase t2, the potential of the first light emitting control signal provided by E1 is a high voltage, the potential of the second light emitting control signal provided by E2 is a high voltage, the potential of the second scan signal provided by S2 is a high voltage, and the potential of the third scan signal is a low voltage, T1 is turned off, T2 is turned on, T4 is turned on, and T5 is turned on; T6 is turned off, and T7 is turned off;

At the beginning of the refresh charging phase t2, T0 is turned on, and the data voltage Vd on the data line D0 charges C1 through T5, T0 and T4 to increase the potential of the gate electrode of T0 until the potential of T0 is increased to Vd+Vth, Vth is the threshold voltage of T0, T0 is turned off to stop charging;

In the refresh light emitting phase t3, the potential of the first light emitting control signal provided by E1 is a low voltage, the potential of the second light emitting control signal provided by E2 is a low voltage, the potential of the second scan signal provided by S2 is a low voltage, and the potential of the third scan signal provided by S3 is a high voltage, T4 is turned off, T5 is turned off, T1 is turned off, T2 is turned off, T6 and T7 are turned on, T0 drives O1 to emit light, and the light emitting current I of O1 is equal to K $(Vdd-Vd)^2$; K is the current coefficient of T0, and Vdd is the voltage value of VDD.

As shown in FIG. 10, the frequency of the first light emitting control signal may be the same as the frequency of the second light emitting control signal, the duty cycle of the first light emitting control signal and the duty cycle of the second light emitting control signal may be the same, and the first light emitting control signal is delayed for a period of time than the second light emitting control signal, and the first light emitting control signal and the second light emitting control signal may be two adjacent light emitting control signals outputted by a light emitting control signal generating circuit;

The first scan signal provided by S1 and the third scan signal provided by S3 may be scan signals with a low level being valid, and the second scan signal provided by S2 may be scan signal with a high level being valid.

During operation of at least one embodiment of the pixel circuit shown in FIG. 9 of the present disclosure, a maintenance display period includes a maintenance reset phase and a maintenance light emitting phase;

In the maintenance reset phase, the potential of the first light emitting control signal provided by E1 is a low voltage, the potential of the second light emitting control signal provided by E2 is a high voltage, the potential of the second scan signal provided by S2 is a high voltage, and the potential of the third scan signal provided by S3 is a high voltage, T1 is turned on, T2 is turned on, and T6 is turned on, so as to write Vi1 into the anode of O1 and clear the residual charge of the anode of O1; T7 is turned off, and T5 is turned off;

In the maintenance light emitting phase, the potential of the first light emitting control signal provided by E1 is a low voltage, the potential of the second light emitting control signal provided by E2 is a low voltage, the potential of the second scan signal provided by S2 is a low voltage, and the potential of the third scan signal provided by S3 is a high voltage, T4 is turned off, T5 is turned off, T1 is turned on, T2 is turned off, T6 and T7 are turned on, T0 drives O1 to emit light, and the light emitting current I of O1 is equal to K (Vdd-Vd) 2; K is the current coefficient of T0, Vdd is the voltage value of VDD; wherein Vd is the data voltage provided by the data line D0 in the adjacent previous refresh charging phase.

When at least one embodiment of the pixel circuit shown in FIG. 9 of the present disclosure is in operation, there is no process of charging the energy storage circuit 23 during the display maintenance period, and in the maintenance light emitting phase, the driving current for the driving circuit 11 driving the light emitting element 11 is still related to the data voltage in the refresh charging phase in the immediately previous refresh display period.

When at least one embodiment of the pixel circuit of the present disclosure shown in FIG. 9 is in operation, when the display panel to which the pixel circuit is applied is displayed at low brightness, that is, when the maximum brightness corresponding to the display brightness range of the display panel is less than or equal to a predetermined brightness, the frequency of the first light emitting control signal and the frequency of the second light emitting control signal can be increased, so that the frequency of the first light emitting control signal and the frequency of the second light emitting control signal are greater than a predetermined frequency, to increase the frequency for resetting the potential of the anode of O1, to improve the Flicker phenomenon at low brightness.

Also, in at least one embodiment of the pixel circuit shown in FIG. 9 of the present disclosure, the potential of the anode of O1 is reset by the transistor controlled by E1 and the transistor controlled by E2, instead of resetting the potential of the anode of O1 by the transistor controlled by the scan signal, so that when the display panel to which the pixel circuit is applied works at a low frequency, in the maintenance display period, the potential of the scan signal does not need to be a valid voltage, which reduces the power consumption of IC at a low frequency.

In at least one embodiment of the present disclosure, the predetermined frequency may be, for example, 50 Hz, but not limited thereto.

In at least one embodiment of the present disclosure, the display panel displaying at low brightness may refer to that the maximum brightness corresponding to the display brightness range of the display panel is less than or equal to a predetermined brightness. The predetermined brightness may be greater than or equal to 100 nits and less than or equal to 140 nits, for example, the predetermined brightness may be 120 nits.

In at least one embodiment of the present disclosure, when the display panel is a display screen included in a mobile phone, the display brightness range can be adjusted by pulling a brightness adjustment bar of the mobile phone.

The display brightness range of the display panel may refer to: the display brightness of the display panel is greater than or equal to the first brightness and less than or equal to the second brightness, and the second brightness is the maximum brightness corresponding to the display brightness range;

The second brightness may refer to: the maximum brightness that the display panel can display;

The first brightness may refer to: the minimum brightness that the display panel can display.

In at least one embodiment of the present disclosure, the display brightness range of the display panel is within the predetermined brightness range, which does not mean that when the display panel displays a predetermined picture, the display brightness range of the display panel is within the predetermined brightness range, but means that when the display panel displays any picture, the display brightness range of the display panel is within a predetermined brightness range.

Figure 11:
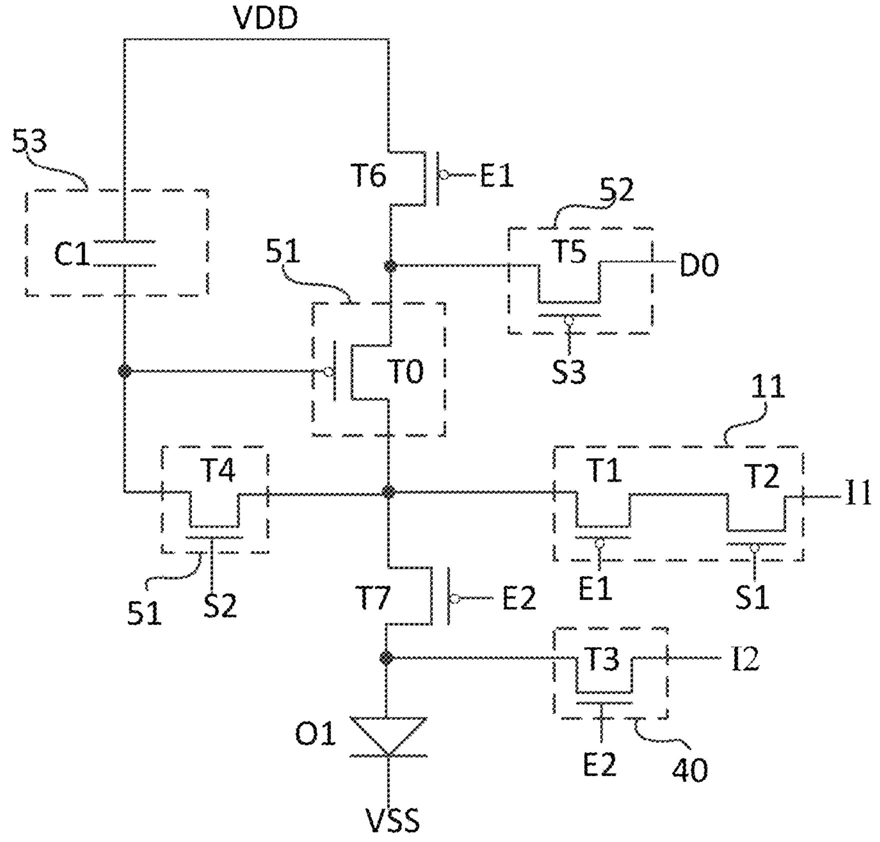
FIG. 11 is a circuit diagram of a pixel circuit according to at least one embodiment of the present disclosure.

As shown in FIG. 11, based on at least one embodiment of the pixel circuit shown in FIG. 8, the light emitting element is an organic light emitting diode O1; the second reset circuit 40 includes a third transistor T3;

The compensation control circuit 51 includes a fourth transistor T4, the data writing-in circuit 52 includes a fifth transistor T5, the driving circuit 12 includes a driving transistor T0, and the energy storage circuit includes a storage capacitor C1;

The gate electrode of the third transistor T3 is electrically connected to the second light emitting control line E2, the source electrode of the third transistor T3 is electrically connected to the second reset voltage line 12, and the drain electrode of the third transistor T3 is electrically connected to the anode of O1;

The gate electrode of the driving transistor T0 is electrically connected to the control end of the driving circuit 12, the drain electrode of the driving transistor T0 is electrically connected to the first end of the driving circuit 12, and the source electrode of the driving transistor T0 is electrically connected to the second end of the driving circuit 12;

The gate electrode of the fourth transistor T4 is electrically connected to the second scan line S2, the source electrode of the fourth transistor T4 is electrically connected to the gate electrode of the driving transistor T0, and the drain electrode of the fourth transistor T4 is electrically connected to the drain electrode of the driving transistor;

The gate electrode of the fifth transistor T5 is electrically connected to the third scan line S3, the source electrode of the fifth transistor T5 is electrically connected to the data line D0, and the drain electrode of the fifth transistor T5 is electrically connected to the source electrode of the driving transistor T0;

The first end of the storage capacitor C1 is electrically connected to the gate electrode of the driving transistor T0, and the second end of the storage capacitor C1 is electrically connected to the high voltage end; the high voltage end is used to provide the high voltage signal VDD;

The first light emitting control circuit includes a sixth transistor T6, and the second light emitting control circuit 22 includes a seventh transistor T7;

The gate electrode of the sixth transistor T6 is electrically connected to the second light emitting control line E2, the source electrode of the sixth transistor T6 is electrically connected to the drain electrode of the driving transistor T0, and the drain electrode of the sixth transistor T6 is electrically connected to the anode of O1;

The gate electrode of the seventh transistor T7 is electrically connected to the first light emitting control line E1, the source electrode of the seventh transistor T7 is electrically connected to the high voltage end, and the drain electrode of the seventh transistor T7 is electrically connected to the source electrode of the driving transistor T0;

The cathode of O1 is electrically connected to the low voltage end; the low voltage end is used for providing the low voltage signal VSS.

In at least one embodiment of the pixel circuit shown in FIGS. 11, T1, T2, T6, T7, T0 and T5 are all p-type transistors, T3 and T4 are n-type transistors; T1, T2, T6, T7, T0 and T5 are low temperature polysilicon thin film transistors, and T3 and T4 are IGZO thin film transistors.

As shown in FIG. 10, when at least one embodiment of the pixel circuit shown in FIG. 11 of the present disclosure is in operation, the refresh display period may include a refresh reset phase t1, a refresh charging phase t2 and a refresh light emitting phase t3;

In the refresh reset phase t1, the potential of the first light emitting control signal provided by E1 is a low voltage, the potential of the second light emitting control signal provided by E2 is a high voltage, the potential of the first scan signal provided by S1 is a low voltage, the potential of the second scan signal provided by S2 is a high voltage, the potential of the third scan signal provided by S3 is a high voltage, T1 and T2 are turned on, T3 is turned on, T4 is turned on, T6 is turned off, the first reset voltage Vi1 provided by I1 is written into the gate electrode of T0, so that TO can be turned on at the beginning of the refresh charging phase; the second reset voltage Vi2 provided by I2 is written into the anode of O1 to clear the charge of the anode of O1;

In the refresh charging phase t2, the potential of the first light emitting control signal provided by E1 is a high voltage, the potential of the second light emitting control signal provided by E2 is a high voltage, the potential of the first scan signal provided by S1 is a low voltage, the potential of the second scan signal provided by S2 is a high voltage, the potential of the third scan signal provided by S3 is low voltage, T1 is turned off, T2 is turned on, and T3 is turned on to write Vi2 into the anode of O1, T4 and T5 are turned on; T6 and T7 are turned off;

At the beginning of the refresh charging phase t2, T0 is turned on, and the data voltage Vd on the data line charges C1 through T5, T4 and T0 to increase the potential of the gate electrode of T0 until the potential of the gate electrode of T0 becomes Vd+Vth, Vth is the threshold voltage of T0, T0 is turned off and stops charging;

In the refresh light emitting phase t3, the potential of the first light emitting control signal provided by E1 is a low voltage, the potential of the second light emitting control signal provided by E2 is a low voltage, the potential of the first scan signal provided by S1 is a high voltage, and the potential of the second scan signal provided by S2 is a low voltage, the potential of the third scan signal provided by S3 is a high voltage, T1, T2, T3, T4 and T5 are all turned off, T6 and T7 are turned on, and T0 drives O1 to emit light;

During a period between the refresh charging phase t2 and the refresh light emitting phase t3, E2 provides a high voltage signal and T3 is turned on to reset the anode of O1.

In at least one embodiment of the present disclosure, the voltage value of Vi2 may be smaller than the voltage value of Vi1.

When at least one embodiment of the pixel circuit of the present disclosure as shown in FIG. 11 is in operation, when the display panel to which the pixel circuit is applied is displayed at low brightness, that is, when the maximum brightness corresponding to the display brightness range is less than or equal to the predetermined brightness, the frequency of the second light emitting control signal can be increased to make the frequency of the second light emitting control signal greater than the predetermined frequency, thereby increasing the frequency for resetting the potential of the anode of O1 and improving the Flicker under low brightness.

In at least one embodiment of the present disclosure, the predetermined frequency may be 50 Hz, and the predetermined brightness may be greater than or equal to 100 nits and less than or equal to 140 nits, but not limited thereto.

Also, in at least one embodiment of the pixel circuit shown in FIG. 11 of the present disclosure, the resetting of the potential of the anode of O1 is performed by the transistor controlled by E2, rather than by the transistor controlled by the scan signal, so that when the display panel to which the pixel circuit is applied works at low frequency, in the maintenance display period, the potential of the scan signal does not need to be a valid voltage, which reduces the power consumption of IC (integrated circuit) at a low frequency.

Figure 12:
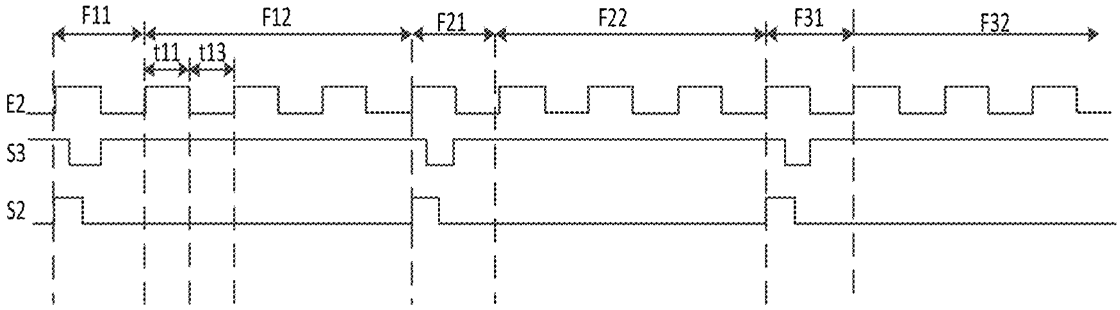
FIG. 12 is a working timing diagram of the pixel circuit as shown in FIG. 11.

As shown in FIG. 12, during operation of at least one embodiment of the pixel circuit shown in FIG. 11 of the present disclosure, under low brightness, the frequency of the first light emitting control signal provided by E2 can be increased, so as to improve Flickering phenomenon of O1 under a low frequency and low brightness.

In FIG. 12, a first refresh frame time is labeled F11, a first maintenance frame time is labeled F12; the second refresh frame time is labeled F21, and the second maintenance frame time is labeled F22, the third refresh frame time is labeled F31, and the third maintenance frame time is labeled F32; each of the maintenance frame times F11, F22, and F32 includes maintenance reset phases t11 and maintenance light emitting phases t13.

In the refresh frame time, there is a refresh charging phase. In the refresh charging phase, E2 provides a high voltage signal, S2 provides a high voltage signal, S3 provides a low voltage signal, and the data voltage provided by the data line D0 charges C1;

In the maintenance frame time, there is no charging phase, S2 can continuously provide a low-voltage signal, and S3 can continuously provide a high-voltage signal, so as to save power consumption.

Figure 13:
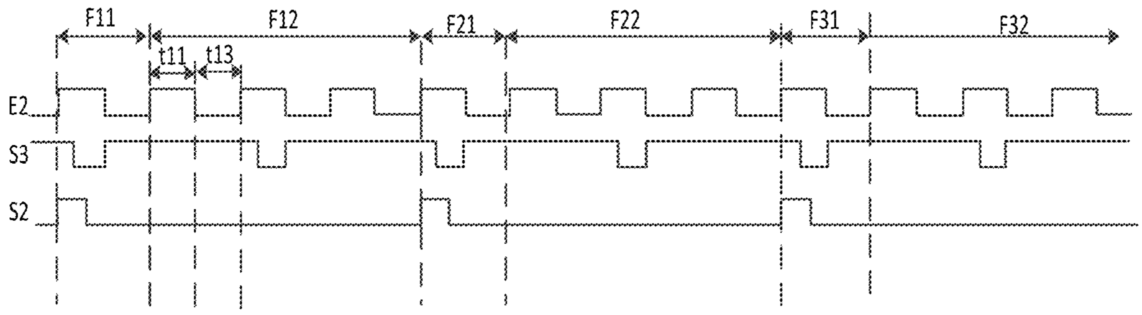
FIG. 13 is another working timing diagram of the pixel circuit as shown in FIG. 11.

The difference between FIG. 13 and FIG. 12 is that in the maintenance frame time, S3 provides a clock signal, but the frequency of the clock signal is low, which can also save power consumption.

The driving method described in the embodiment of the present disclosure is applied to the above-mentioned pixel circuit, and the pixel circuit is applied to a display panel. The driving method includes: in a refresh reset phase and a maintenance reset phase, controlling, by a first reset circuit, to write a first reset voltage provided by a first reset voltage line into a first end of a driving circuit under the control of a first light emitting control signal provided by a light emitting control line and a reset control signal provided by a reset control line.

In the driving method of the pixel circuit described in the embodiment of the present disclosure, the first reset circuit writes the first reset voltage into the first end of the driving circuit under the control of the first light emitting control signal and the reset control signal, with the cooperation of the compensation control circuit, the first reset circuit writes the first reset voltage into the control end of the driving circuit in the refresh reset phase and the maintenance reset phase, so that a new pixel circuit structure can also be used to reset an essential node.

Optionally, the pixel circuit further includes a compensation control circuit; the driving method may further include:

in the refresh reset phase, controlling, by the compensation control circuit, to connect the first end of the driving circuit and the control end of the driving circuit under the control of the second scan signal provided by the second scan line, to write a first reset voltage into the control end of the driving circuit, so that when the refresh charging phase starts, the driving circuit can connect the first end and the second end under the control of the potential of the control end.

In at least one embodiment of the present disclosure, the pixel circuit may further include a light emitting element, a compensation control circuit, a data writing-in circuit, an energy storage circuit, a first light emitting control circuit, and a second light emitting control circuit; the refresh display period may further include a refresh charging phase and a refresh light emitting phase after the refresh reset phase; the driving method may further include:

In the refresh charging phase, controlling, by the data writing-in circuit, to write the data voltage on the data line into the second end of the driving circuit under the control of the third scan signal provided by the third scan line, and controlling, by the compensation control circuit, to connect the first end of the driving circuit and the control end of the driving circuit under the control of the second scan signal, so as to charge the energy storage circuit through the data voltage, and increase the potential of the control end of the driving circuit until the driving circuit disconnects the first end from the second end under the control of the potential of the control end of the driving circuit;

In the refresh light emitting phase, the first light emitting control circuit controls to connect the first end of the driving circuit and the first electrode of the light emitting element, the second light emitting control circuit controls to connect the first voltage end and the second end of the driving circuit, and the driving circuit drives the light emitting element to emit light.

Optionally, the pixel circuit further includes a first light emitting control circuit and a light emitting element; the reset control line is a second light emitting control line; the first light emitting control circuit is electrically connected to the first light emitting control line; the driving method also includes:

In the refresh reset phase and the maintenance reset phase, controlling, by the first light emitting control circuit, to connect the first end of the driving circuit and the first electrode of the light emitting element under the control of the first light emitting control signal, so as to control to write the first reset voltage into the first electrode of the light emitting element to reset the potential of the first electrode of the light emitting element, so as to clear the residual charge of the first electrode of the light emitting element.

The driving method described in at least one embodiment of the present disclosure may further include:

Detecting a display brightness range of the display panel, and when the maximum brightness corresponding to the display brightness range is less than or equal to a predetermined brightness, controlling to increase the frequency of the first light emitting control signal and the frequency of the second light emitting control signal provided by the second light emitting control line, so that the frequency of the first light emitting control signal and the frequency of the second light emitting control signal are greater than a predetermined frequency.

When it is detected that the maximum brightness corresponding to the display brightness range is less than or equal to the predetermined brightness, the frequency of the first light emitting control signal and the frequency of the second light emitting control signal can be increased, so that the frequency of the first light emitting control signal and the frequency of the second light emitting control signal are greater than the predetermined frequency, thereby increasing the frequency for resetting the potential of the anode of O1, and improving the Flicker phenomenon under low brightness.

Optionally, the predetermined frequency may be 50 Hz, and the predetermined brightness may be greater than or equal to 100 nits and less than or equal to 140 nits.

Optionally, the pixel circuit further includes a first light emitting control circuit, a second reset circuit and a light emitting element; the first light emitting control circuit is electrically connected to the second light emitting control line; the driving method further includes:

In the refresh reset phase and the maintenance reset phase, controlling, by the first light emitting control circuit, to disconnect the first end of the driving circuit from the first electrode of the light emitting element under the control of the second light emitting control signal, and controlling, by the second reset circuit, to write the second reset voltage into the first electrode of the light emitting element under the control of the second light emitting control signal.

When the pixel circuit further includes a second reset circuit, the second reset circuit writes the second reset voltage into the first electrode of the light emitting element under the control of the second light emitting control signal in the refresh reset phase and the maintenance reset phase, to reset the potential of the first electrode of the light emitting element.

The driving method described in at least one embodiment of the present disclosure may further include:

Detecting the display brightness range of the display panel, and when the maximum brightness corresponding to the display brightness range is less than or equal to a predetermined brightness, controlling to increase the frequency of the second light emitting control signal provided by the second light emitting control line, so that the frequency of the second light emitting control signal is greater than the predetermined frequency.

When the display panel is displayed at low brightness, that is, when it is detected that the maximum brightness corresponding to the display brightness range of the display panel is less than or equal to the predetermined brightness, the frequency of the second light emitting control signal can be increased, so that the frequency of the second light emitting control signal is higher than the predetermined frequency, to increase the frequency for resetting the potential of the first electrode of the light emitting element, and improve the flicker phenomenon under low brightness.

In at least one embodiment of the present disclosure, the maintenance display period further includes a maintenance light emitting phase after the maintenance reset phase; the driving method further includes:

In the maintenance light emitting phase, controlling, by the first light emitting control circuit, to connect the first end of the driving circuit and the first electrode of the light emitting element, and controlling, by the second light emitting control circuit, to connect the first voltage end and the second end of the driving circuit, driving, by the driving circuit, the light emitting element to emit light.

The display device according to the embodiment of the present disclosure includes the above-mentioned pixel circuit.

The display device provided by at least one embodiment of the present disclosure may be any product or component with a display function, such as a mobile phone, a tablet computer, a TV, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a first reset circuit and a driving circuit, wherein the first reset circuit is respectively electrically connected to a first light emitting control line, a reset control line, a first reset voltage line and a first end of the driving circuit, and is configured to write a first reset voltage provided by the first reset voltage line into the first end of driving circuit under the control of a first light emitting control signal provided by the first light emitting control line and a reset control signal provided by the reset control line;

the driving circuit is configured to connect the first end of the driving circuit and a second end of the driving circuit under the control of a potential of a control end of the driving circuit, wherein the first reset circuit comprises a first transistor and a second transistor;

a control electrode of the first transistor is electrically connected to the first light emitting control line, and a first electrode of the first transistor is electrically connected to the first end of the driving circuit;

a control electrode of the second transistor is electrically connected to the reset control line, a first electrode of the second transistor is electrically connected to a second electrode of the first transistor, and a second electrode of the second transistor is electrically connected to the first reset voltage line, wherein the reset control line is a second light emitting control line, the first transistor is a p-type transistor, and the second transistor is an n-type transistor; the pixel circuit includes a first light emitting control circuit and a second light emitting control circuit; the first light emitting control circuit is respectively electrically connected to the first light emitting control line, the first end of the driving circuit and a first electrode of a light emitting element, and is configured to control to connect the first end of the driving circuit and the first electrode of the light emitting element under the control of the first light emitting control signal; the second light emitting control circuit is respectively electrically connected to the second light emitting control line, the first voltage end and the second end of the driving circuit, and is configured to control to connect the first voltage end and the second end of the driving circuit under the control of a second light emitting control signal provided by the second light emitting control line; or the reset control line is a first scan line, and both the first transistor and the second transistor are p-type transistors; the pixel circuit includes a first light emitting control circuit and a second light emitting control circuit; the first light emitting control circuit is respectively electrically connected to the second light emitting control line, the first end of the driving circuit and the first electrode of the light emitting element, and is configured to control to connect the first end of the driving circuit and the first electrode of the light emitting element under the control of the second light emitting control signal provided by the second light emitting control line; the second light emitting control circuit is respectively electrically connected to the first light emitting control line, the first voltage end and the second end of the driving circuit, and is configured to control to connect the first voltage end and the second end of the driving circuit under the control of the first light emitting control signal.

2. The pixel circuit according to claim 1, wherein when the reset control line is the first scan line:

the pixel circuit further comprises a second reset circuit;

the second reset circuit is respectively electrically connected to the second light emitting control line, a second reset voltage line and the first electrode of the light emitting element, and is configured to control to write a second reset voltage provided by the second reset voltage line into the first electrode of the light emitting element under the control of the second light emitting control signal.

3. The pixel circuit according to claim 2, wherein the second reset circuit comprises a third transistor;

a control electrode of the third transistor is electrically connected to the second light emitting control line, a first electrode of the third transistor is electrically connected to the second reset voltage line, and a second electrode of the third transistor is electrically connected to the first electrodes of the light emitting element.

4. The pixel circuit according to claim 3, wherein the third transistor is an n-type transistor.

5. The pixel circuit according to claim 1, further comprising a compensation control circuit, a data writing-in circuit and an energy storage circuit;

the compensation control circuit is electrically connected to a second scan line, the control end of the driving circuit and the first end of the driving circuit, respectively, and is configured to control to connect the control end of the driving circuit and the first end of the driving circuit under the control of a second scan signal provided by the second scan line;

the data writing-in circuit is electrically connected to a third scan line, a data line and the second end of the driving circuit respectively, and is configured to write a data voltage on the data line into the second end of the driving circuit under the control of a third scan signal provided by the third scan line;

the energy storage circuit is electrically connected to the control end of the driving circuit and is configured to store electrical energy.

6. The pixel circuit according to claim 5, wherein the compensation control circuit includes a fourth transistor, the data writing-in circuit includes a fifth transistor, the driving circuit includes a driving transistor, and the energy storage circuit includes a storage capacitor;

a control electrode of the driving transistor is electrically connected to the control end of the driving circuit, a first electrode of the driving transistor is electrically connected to the first end of the driving circuit, and a second electrode of the driving transistor is electrically connected to the second end of the driving circuit;

a control electrode of the fourth transistor is electrically connected to the second scan line, a first electrode of the fourth transistor is electrically connected to the control electrode of the driving transistor, and a second electrode of the fourth transistor is electrically connected to the first electrode of the driving circuit;

a control electrode of the fifth transistor is electrically connected to the third scan line, a first electrode of the fifth transistor is electrically connected to the data line, and a second electrode of the fifth transistor is electrically connected to the second electrode of the driving transistor;

a first end of the storage capacitor is electrically connected to the control electrode of the driving transistor, and a second end of the storage capacitor is electrically connected to the first voltage end.

7. The pixel circuit according to claim 1, wherein when the reset control line is the second light emitting control line:

the first light emitting control circuit includes a sixth transistor, and the second light emitting control circuit includes a seventh transistor;

a control electrode of the sixth transistor is electrically connected to the first light emitting control line, a first electrode of the sixth transistor is electrically connected to the first end of the driving circuit, and a second electrode of the sixth transistor is electrically connected to the first electrode of the light emitting element;

a control electrode of the seventh transistor is electrically connected to the second light emitting control line, a first electrode of the seventh transistor is electrically connected to the first voltage end, and a second electrode of the seventh transistor is electrically connected to the second end of the driving circuit;

a second electrode of the light emitting element is electrically connected to the second voltage end.

8. The pixel circuit according to claim 1, wherein when the reset control line is the first scan line:

the first light emitting control circuit includes a sixth transistor, and the second light emitting control circuit includes a seventh transistor;

a control electrode of the sixth transistor is electrically connected to the second light emitting control line, a first electrode of the sixth transistor is electrically connected to the first end of the driving circuit, and a second electrode of the sixth transistor is electrically connected to the first electrode of the light emitting element;

a control electrode of the seventh transistor is electrically connected to the first light emitting control line, a first electrode of the seventh transistor is electrically connected to the first voltage end, and a second electrode of the seventh transistor is electrically connected to the second end of the driving circuit;

a second electrode of the light emitting element is electrically connected to the second voltage end.

9. A driving method, applied to the pixel circuit according to claim 1, wherein the pixel circuit is applied to a display panel, the driving method comprises: in a refresh reset phase and a maintenance reset phase, controlling, by the first reset circuit, to write the first reset voltage provided by the first reset voltage line into the first end of the driving circuit under the control of the first light emitting control signal provided by the light emitting control line and the reset control signal provided by the reset control line.

10. The driving method according to claim 9, wherein the pixel circuit further comprises a compensation control circuit;

the driving method further includes: in the refresh reset phase, controlling, by the compensation control circuit, to connect the first end of the driving circuit and the control end of the driving circuit under the control of a second scan signal provided by a second scan line, to write the first reset voltage into the control end of the driving circuit.

11. The driving method according to claim 9, wherein the pixel circuit further comprises a compensation control circuit, a data writing-in circuit, and an energy storage circuit; a refresh display period further includes a refresh charging phase and a refresh light emitting phase after the refresh reset phase; the driving method further includes:

in the refresh charging phase, controlling, by the data writing-in circuit, to write a data voltage on a data line into the second end of the driving circuit under the control of a third scan signal provided by a third scan line, and controlling, by the compensation control circuit, to connect the first end of the driving circuit and the control end of the driving circuit under the control of the second scan signal;

in the refresh light emitting phase, controlling, by the first light emitting control circuit, to connect the first end of the driving circuit and the first electrode of the light emitting element, controlling, by the second light emitting control circuit, to connect the first voltage end and the second end of the driving circuit; and driving, by the driving circuit, the light emitting element to emit light.

12. The driving method according to claim 11, wherein when the reset control line is the second light emitting control line, the driving method further includes:

in the refresh reset phase and the maintenance reset phase, controlling, by the first light emitting control circuit, to connect the first end of the driving circuit and the first electrode of the light emitting element under the control of the first light emitting control signal, to control to write the first reset voltage into the first electrode of the light emitting element, detecting a display brightness range of the display panel, and when maximum brightness corresponding to the display brightness range is less than or equal to a predetermined brightness, controlling to increase a frequency of the first light emitting control signal and a frequency of the second light emitting control signal provided by the second light emitting control line, so that the frequency of the first light emitting control signal and the frequency of the second light emitting control signal are greater than a predetermined frequency.

13. The driving method according to claim 11, wherein the pixel circuit further comprises a second reset circuit, when the first light emitting control circuit is electrically connected to the second light emitting control line; the driving method further includes:

in the refresh reset phase and the maintenance reset phase, controlling, by the first light emitting control circuit, to disconnect the first end of the driving circuit from the first electrode of the light emitting element under the control of the second light emitting control signal, and controlling, by the second reset circuit, to write the second reset voltage into the first electrode of the light emitting element under the control of the second light emitting control signal, detecting a display brightness range of the display panel, and when maximum brightness corresponding to the display brightness range is less than or equal to a predetermined brightness, controlling to increase a frequency of the second light emitting control signal provided by the second light emitting control line, so that the frequency of the second light emitting control signal is greater than a predetermined frequency.

14. The driving method according to claim 11, wherein a maintenance display period further includes a maintenance light emitting phase after the maintenance reset phase; the driving method further includes:

in the maintenance light emitting phase, controlling, by the first light emitting control circuit, to connect the first end of the driving circuit and the first electrode of the light emitting element; controlling, by the second light emitting control circuit, to connect the first voltage end and the second end of the driving circuit; driving, by the driving circuit, the light emitting element to emit light.

15. A display device comprising the pixel circuit according to claim 1.

16. A pixel circuit, comprising a first reset circuit and a driving circuit, wherein the first reset circuit is respectively electrically connected to a first light emitting control line, a reset control line, a first reset voltage line and a first end of the driving circuit, and is configured to write a first reset voltage provided by the first reset voltage line into the first end of driving circuit under the control of a first light emitting control signal provided by the first light emitting control line and a reset control signal provided by the reset control line;

the driving circuit is configured to connect the first end of the driving circuit and a second end of the driving circuit under the control of a potential of a control end of the driving circuit, wherein the first reset circuit comprises a first transistor and a second transistor;

a control electrode of the first transistor is electrically connected to the reset control line, and a first electrode of the first transistor is electrically connected to the first end of the driving circuit;

a control electrode of the second transistor is electrically connected to the first light emitting control line, a first electrode of the second transistor is electrically connected to a second electrode of the first transistor, and a second electrode of the second transistor is electrically connected to the first reset voltage line, wherein the reset control line is a second light emitting control line, the first transistor is an n-type transistor, and the second transistor is a p-type transistor;

the pixel circuit includes a first light emitting control circuit and a second light emitting control circuit;

the first light emitting control circuit is respectively electrically connected to the first light emitting control line, the first end of the driving circuit and a first electrode of the light emitting element, and is configured to control to connect the first end of the driving circuit and the first electrode of the light emitting element under the control of the first light emitting control signal;

the second light emitting control circuit is respectively electrically connected to the second light emitting control line, the first voltage end and the second end of the driving circuit, and is configured to control to connect the first voltage end and the second end of the driving circuit under the control of a second light emitting control signal provided by the second light emitting control line.

* * * * *